US008224659B2

(12) United States Patent
Lee et al.

(10) Patent No.: US 8,224,659 B2
(45) Date of Patent: Jul. 17, 2012

(54) AUDIO ENCODING METHOD AND APPARATUS, AND AUDIO DECODING METHOD AND APPARATUS, FOR PROCESSING DEATH SINUSOID AND GENERAL CONTINUATION SINUSOID

(75) Inventors: Nam-suk Lee, Suwon-si (KR); Geon-hyoung Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 12/174,875

(22) Filed: Jul. 17, 2008

(65) Prior Publication Data

US 2009/0048849 A1 Feb. 19, 2009

(30) Foreign Application Priority Data

Aug. 17, 2007 (KR) ........................ 10-2007-0083021

(51) Int. Cl.
*G10L 19/00* (2006.01)
*G10L 15/00* (2006.01)
*G10L 11/04* (2006.01)

(52) U.S. Cl. .......................... 704/500; 702/206; 702/241

(58) Field of Classification Search .................. 704/265, 704/500, 206, 241
See application file for complete search history.

(56) References Cited

U.S. PATENT DOCUMENTS 4,885,790 A * 12/1989 McAulay et al. ............. 704/265
6,266,644 B1 7/2001 Levine
2002/0065655 A1* 5/2002 Gournay et al. .............. 704/241
2004/0204936 A1 10/2004 Jensen et al.
2006/0036431 A1 2/2006 Den Brinker et al.
2006/0130637 A1* 6/2006 Crebouw ........................ 84/603

FOREIGN PATENT DOCUMENTS

KR 2003-0010702 A 2/2003
KR 10-2004-0055788 A 6/2004
WO WO 02/087241 A1 10/2002
WO WO 03/036619 A1 5/2003
WO 2006018748 A1 2/2006
WO 2006051451 A1 5/2006

OTHER PUBLICATIONS

A Comparison of Differential Schemes for Low-Rate Sinusoidal Audio Coding by Jesper Jensen and Richard Heusdens, both of the Department of Mediamatics, Delft University of Technology, Delft, The Netherlands as published in the IEEE Workshop on Applications of Signal Processing to Audio and Acoustics, Oct. 19-22, 2003, New Paltz, NY.*

* cited by examiner

*Primary Examiner* — James S. Wozniak
*Assistant Examiner* — Neeraj Sharma
(74) *Attorney, Agent, or Firm* — Sughrue Mion, PLLC

(57) ABSTRACT

An audio encoding method and apparatus, and an audio decoding method and apparatus, for processing a death sinusoid and a general continuation sinusoid. Using the unique characteristic of a death sinusoid, in that the death sinusoid has a tendency such that an amplitude component of the death sinusoid is less than that of a previous sinusoid, a method of adding an encoding syntax by distinguishing a general continuation sinusoid from a death sinusoid is provided. That is, when difference coding of the amplitude component of a death sinusoid is performed, the number of bits used when a negative number is coded is less than the number of bits used when a positive number is coded, in a Huffman table. By using this method, a bit rate in an entire coding decreases.

12 Claims, 7 Drawing Sheets

FIG. 7

| TEST SEQUENCE | GAIN(%) OF AMPLITUDE IN CONTINUATION | GAIN(%) IN ENTIRE BIT RATE |
|---|---|---|
| Bass | 1.3 | 0.6 |
| Brahms | 1.3 | 0.7 |
| Dongwoo | 2.1 | 0.9 |
| Dust | 1.3 | 0.6 |
| Gspi | 0.8 | 0.5 |
| Harp | 0.0 | 0.0 |
| Horn | 0.7 | 0.4 |
| Hotel | 1.9 | 0.9 |
| Spff | 5.1 | 1.8 |
| Trilogy | 1.2 | 0.6 |
| AVERAGE GAIN(%) | 1.6 | 0.7 |

AUDIO ENCODING METHOD AND APPARATUS, AND AUDIO DECODING METHOD AND APPARATUS, FOR PROCESSING DEATH SINUSOID AND GENERAL CONTINUATION SINUSOID

CROSS-REFERENCE TO RELATED PATENT APPLICATION

This application claims the benefit of Korean Patent Application No. 10-2007-0083021, filed on Aug. 17, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding of audio, and more particularly, to an audio encoding method and apparatus, and an audio decoding method and apparatus, for processing a death sinusoid and a general continuation sinusoid in different ways.

2. Description of the Related Art

Parametric coding is a coding method of representing audio with specific parameters, and the parametric coding is used in the Moving Picture Experts Group 4 (MPEG-4) standard.

FIG. 1 is a block diagram for describing a parametric coding method according to the prior art. In the parametric coding method, an input signal is analyzed and parameterized. In detail, an input audio signal is filtered (audio reading and filtering). By analyzing the input audio signal using three analysis methods, such as transient analysis, sinusoid analysis, and noise analysis, parameters corresponding to audio components in respective areas are extracted. The transient analysis corresponds to a change of very dynamic audio. The sinusoidal analysis corresponds to a change of deterministic audio. The noise analysis corresponds to a change of stochastic or non-deterministic audio. Then, the extracted parameters are formatted into a bitstream.

A sinusoid extracted by the sinusoidal analysis is also called a partial.

After the sinusoidal analysis is performed, tracking of the sinusoid is performed in order to perform Adaptive Differential Pulse Code Modulation (ADPCM) or Differential Pulse Code Modulation (DPCM) on the sinusoid. The "tracking" means that sinusoids continuing between sinusoids included in previous and subsequent frames are found and a correlation between them is set.

A sinusoid of a current frame, which cannot be tracked from sinusoids of a previous frame, is called a birth sinusoid or a birth partial. The terminology "birth" means that a sinusoid is not continual from a sinusoid of a previous frame and is newly born, i.e. created, in a current frame. For a birth sinusoid, difference coding using a sinusoid of a previous frame cannot be performed, and thus, absolute coding must be performed. Thus, a number of bits are necessary for coding.

On the other hand, a sinusoidal component of a current frame, which can be tracked from sinusoids of a previous frame, is called a continuation sinusoid or a continuation partial. Since difference coding using a sinusoid of a previous frame can be performed for a continuation sinusoid, efficient coding can be performed.

A sinusoid, which is not continual with a sinusoid of a subsequent frame and disappears from among continuation sinusoids, is called a death sinusoid or a death partial.

FIG. 2 is a diagram for describing a death sinusoid.

Referring to FIG. 2, death sinusoids 3, 5, 7, 9, 11, 13, and 15 are illustrated.

For the death sinusoid 3, tracking starts from a birth sinusoid 1 that is connected to a continuation sinusoid 2, and the tracking ends at the death sinusoid 3.

In a conventional audio encoding method, such a death sinusoid is not particularly considered. Thus, the same encoding as that of a general continuation sinusoid is applied to such death sinusoids.

FIG. 3 is a flowchart illustrating an audio encoding method according to the prior art.

Referring to FIG. 3, a sinusoid is extracted by performing sinusoidal analysis, in operation S10, and by performing sinusoid tracking, in operation S20, to determine whether the extracted sinusoid is connected to a sinusoid of a previous frame. If it is determined, in operation S20, that the extracted sinusoid is not connected to the sinusoid of a previous frame, the extracted sinusoid is determined to be a birth sinusoid. However, if it is determined, in operation S20, that the extracted sinusoid is connected to the sinusoid of a previous frame, the extracted sinusoid is determined to be a continuation sinusoid. Then, additional consideration for a death sinusoid is not performed.

The extracted sinusoid is quantized, in operation S30, and it is determined in operation S40 whether the sinusoid to be encoded is a birth sinusoid. If it is determined, in operation S40, that the sinusoid to be encoded is a birth sinusoid, absolute coding is performed for an amplitude component, in operation S50. This absolute coding is called birth amplitude coding. If it is determined, in operation S40, that the sinusoid to be encoded is not a birth sinusoid, a difference between the amplitude component of the sinusoid and an amplitude component of a continued sinusoid of a previous frame is obtained and is coded, in operation S60. This difference coding is called continuation amplitude coding.

As described above, in the conventional audio encoding method, a death sinusoid is not particularly considered. However, since the death sinusoid has a unique characteristic, if the unique characteristic is used, a more efficient audio coding can be performed. Thus, the present invention will use the unique characteristic of a death sinusoid to perform a more efficient audio coding.

SUMMARY OF THE INVENTION

As described above, since a death sinusoid, i.e., a death partial, has a unique characteristic, if the unique characteristic is used, a more efficient audio coding can be performed. The present invention provides a method and apparatus for decoding audio more efficiently, and a method and apparatus for decoding the audio encoded in the audio encoding method, by describing the unique characteristic of a death partial and processing a death partial and a general continuation sinusoid in different ways using the unique characteristic.

The unique characteristic of a death partial is that an amplitude component of the death partial has a tendency to be less than that of a previous partial being tracked. This is because a death partial is a disappearing portion of a signal.

Thus, if a difference value between an amplitude component of a death partial and an amplitude component of a previous partial is obtained, in most cases, the difference value becomes a value less than 0.

The present invention provides a method of adding an encoding syntax by distinguishing a general continuation partial from a death partial. That is, when difference coding of an amplitude component of a death partial is performed, the number of bits used for coding a negative number in a Huffman table is less than the number of bits used for coding a positive number in the Huffman table.

According to an aspect of the present invention, there is provided an audio encoding method comprising: extracting sinusoids of a current frame by performing sinusoidal analysis of an input audio signal; obtaining a birth sinusoid, which is not connected to a sinusoid of a previous frame, a continuation sinusoid, which is connected to a sinusoid of the previous frame and a sinusoid of a subsequent frame, and a death sinusoid, which is connected to a sinusoid of the previous frame and which is not connected to a sinusoid of the subsequent frame, by performing sinusoid tracking of the extracted sinusoids of the current frame; performing absolute coding of the amplitude of the birth sinusoid; performing Huffman coding of a difference between the amplitude of the continuation sinusoid and the amplitude of the sinusoid of the previous frame to which the continuation sinusoid is connected, using a first Huffman table; and performing Huffman coding of a difference between the amplitude of the death sinusoid and the amplitude of the sinusoid of the previous frame to which the death sinusoid is connected, using a second Huffman table different from the first Huffman table.

In the second Huffman table, a number of bits used when a negative number is coded may be less than a number of bits used when a positive number is coded.

According to another aspect of the present invention, there is provided an audio encoding apparatus comprising: a sinusoid analyzer extracting sinusoids of a current frame by performing sinusoidal analysis of an input audio signal; a sinusoid tracking unit obtaining a birth sinusoid, which is not connected to a sinusoid of a previous frame, a continuation sinusoid, which is connected to a sinusoid of the previous frame and a sinusoid of a subsequent frame, and a death sinusoid, which is connected to a sinusoid of the previous frame and which is not connected to a sinusoid of the subsequent frame, by performing sinusoid tracking of the extracted sinusoids of the current frame; a birth sinusoid coder which performs absolute coding of the amplitude of the birth sinusoid; a continuation sinusoid coder which performs Huffman coding of a difference between the amplitude of the continuation sinusoid and the amplitude of the sinusoid of the previous frame to which the continuation sinusoid is connected, using a first Huffman table; and a death sinusoid coder which performs Huffman coding of a difference between the amplitude of the death sinusoid and the amplitude of the sinusoid of the previous frame to which the death sinusoid is connected, using a second Huffman table that is different from the first Huffman table.

In the second Huffman table, a number of bits used when a negative number is coded may be less than a number of bits used when a positive number is coded.

According to another aspect of the present invention, there is provided an audio decoding method comprising: determining whether a sinusoid to be decoded is a birth sinusoid, which is not connected to a sinusoid of a previous frame, a continuation sinusoid, which is connected to a sinusoid of the previous frame and a sinusoid of a subsequent frame, or a death sinusoid, which is connected to a sinusoid of the previous frame and which is not connected to a sinusoid of the subsequent frame; extracting encoded amplitude information of the sinusoid from an input bitstream; if the sinusoid to be decoded is the birth sinusoid, obtaining the amplitude of the birth sinusoid by decoding the encoded amplitude information; if the sinusoid to be decoded is the continuation sinusoid, obtaining the amplitude of the continuation sinusoid by performing Huffman decoding of the encoded amplitude information using a first Huffman table and adding the decoded value to the sinusoid of the previous frame to which the continuation sinusoid is connected; and if the sinusoid to be decoded is the death sinusoid, obtaining the amplitude of the death sinusoid by performing Huffman decoding of the encoded amplitude information using a second Huffman table that is different from the first Huffman table and adding the decoded value to the sinusoid of the previous frame to which the death sinusoid is connected.

In the second Huffman table, a number of bits used when a negative number is coded may be less than a number of bits used when a positive number is coded.

According to another aspect of the present invention, there is provided an audio decoding apparatus comprising: a sinusoid type determiner which determines whether a sinusoid to be decoded is a birth sinusoid, which is not connected to a sinusoid of a previous frame, a continuation sinusoid, which is connected to a sinusoid of the previous frame and a sinusoid of a subsequent frame, or a death sinusoid, which is connected to a sinusoid of the previous frame and which is not connected to a sinusoid of the subsequent frame; an amplitude information extractor which extracts encoded amplitude information of the sinusoid from an input bitstream; a birth sinusoid decoder which, if the sinusoid to be decoded is the birth sinusoid, obtains the amplitude of the birth sinusoid by decoding the encoded amplitude information; a continuation sinusoid decoder which, if the sinusoid to be decoded is the continuation sinusoid, obtains the amplitude of the continuation sinusoid by performing Huffman decoding of the encoded amplitude information using a first Huffman table and adding the decoded value to the sinusoid of the previous frame to which the continuation sinusoid is connected; and a death sinusoid decoder which, if the sinusoid to be decoded is the death sinusoid, obtains the amplitude of the death sinusoid by performing Huffman decoding of the encoded amplitude information using a second Huffman table different from the first Huffman table and adding the decoded value to the sinusoid of the previous frame to which the death sinusoid is connected.

In the second Huffman table, a number of bits used when a negative number is coded may be less than a number of bits used when a positive number is coded.

BRIEF DESCRIPTION OF THE DRAWINGS

The above and other features of the present invention will become more apparent by describing in detail exemplary embodiments thereof with reference to the attached drawings in which:

FIG. 7 is a table showing a gain in the number of bits when an audio encoding method according to an exemplary embodiment of the present invention is used in comparison to the prior art.

DETAILED DESCRIPTION OF EXEMPLARY EMBODIMENTS OF THE PRESENT INVENTION

An audio encoding method and apparatus, and an audio decoding method and apparatus, according to the present invention will be described in detail by explaining exemplary embodiments of the invention with reference to the attached drawings.

Figure 1:
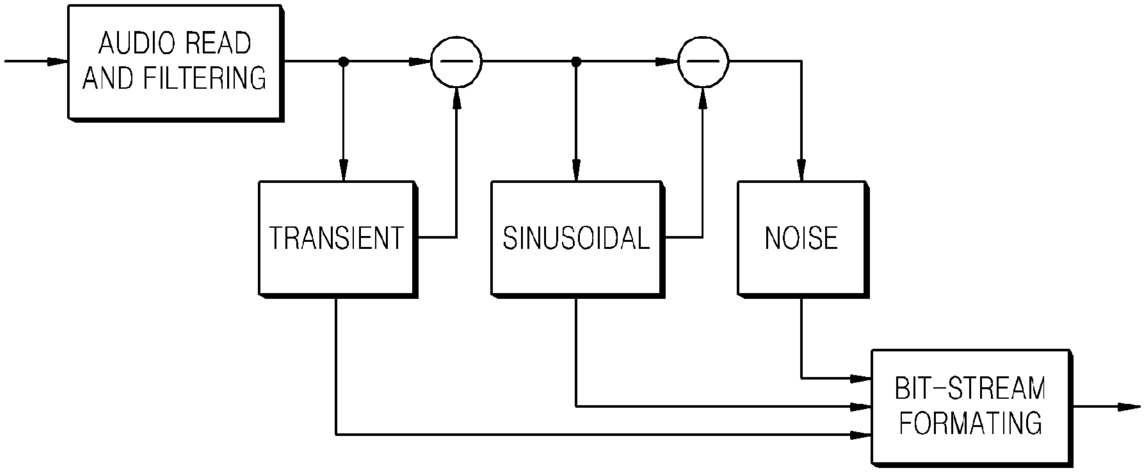
FIG. 1 (RELATED ART)
FIG. 1 is a block diagram for describing a parametric coding method according to the prior art.
Figure 2:
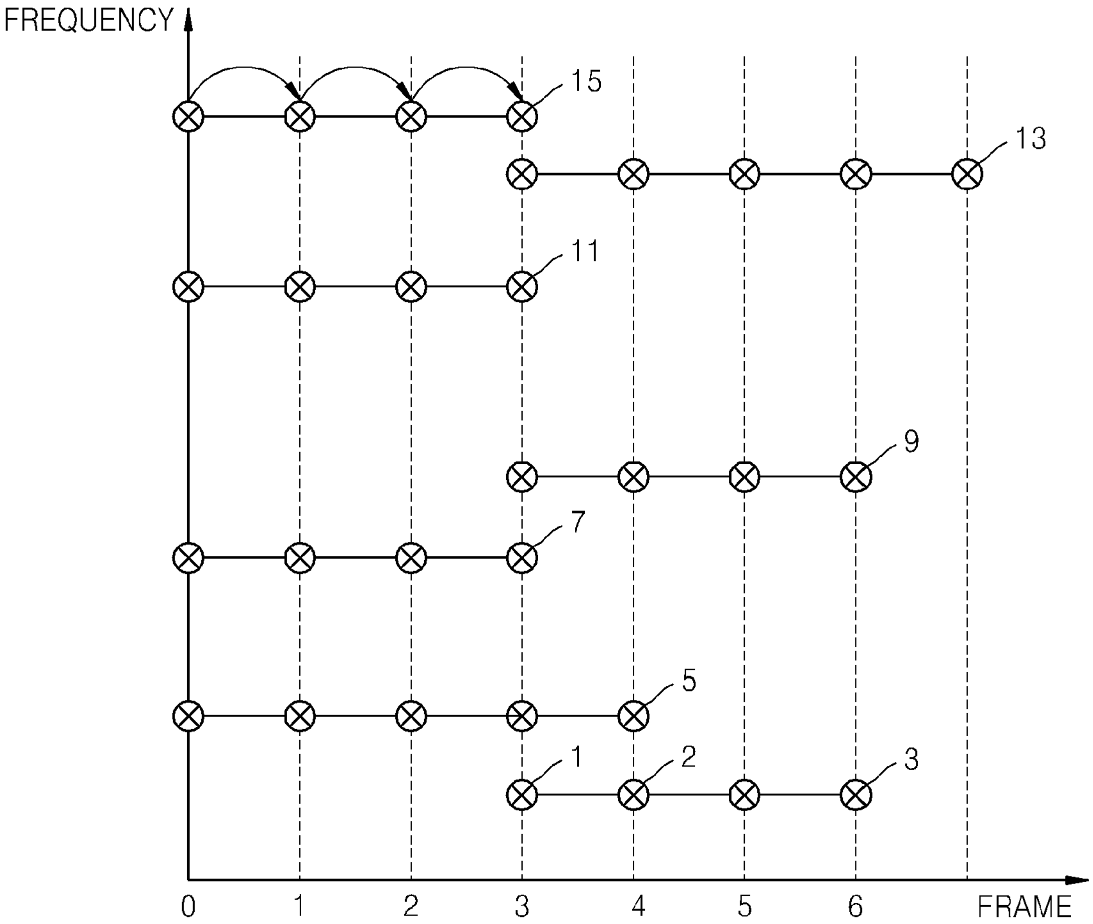
FIG. 2 (RELATED ART)
FIG. 2 is a diagram for describing a death sinusoid.
Figure 3:
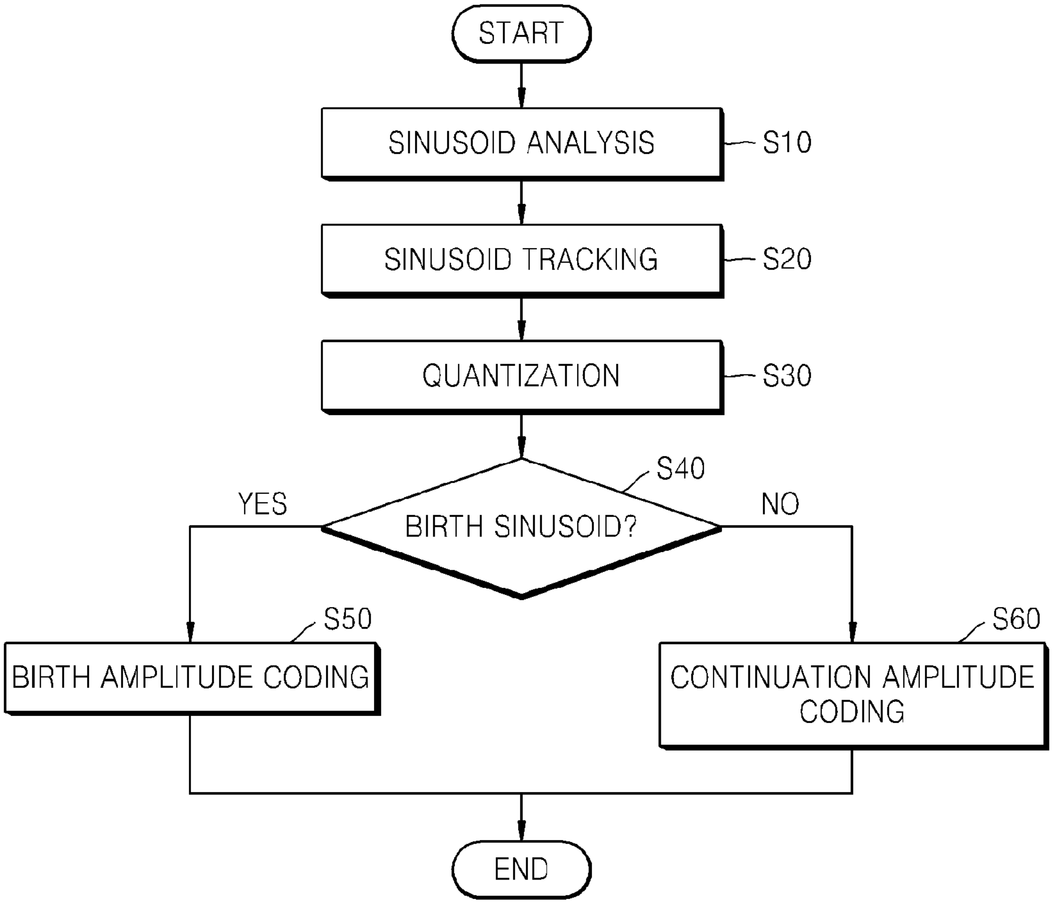
FIG. 3 (RELATED ART)
FIG. 3 is a flowchart illustrating an audio encoding method according to the prior art.
Figure 4:
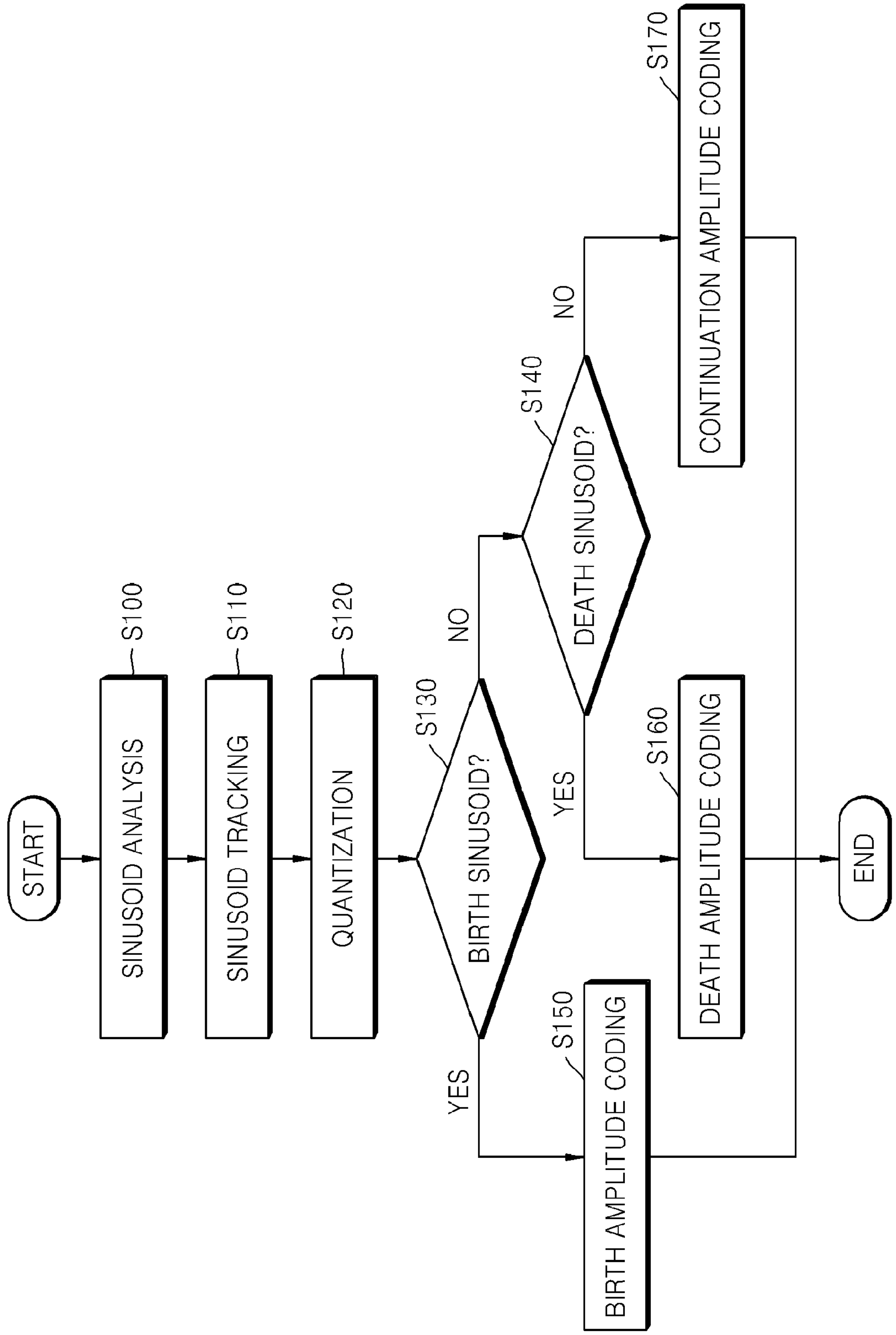
FIG. 4 is a flowchart illustrating an audio encoding method according to an exemplary embodiment of the present invention.
Figure 5:
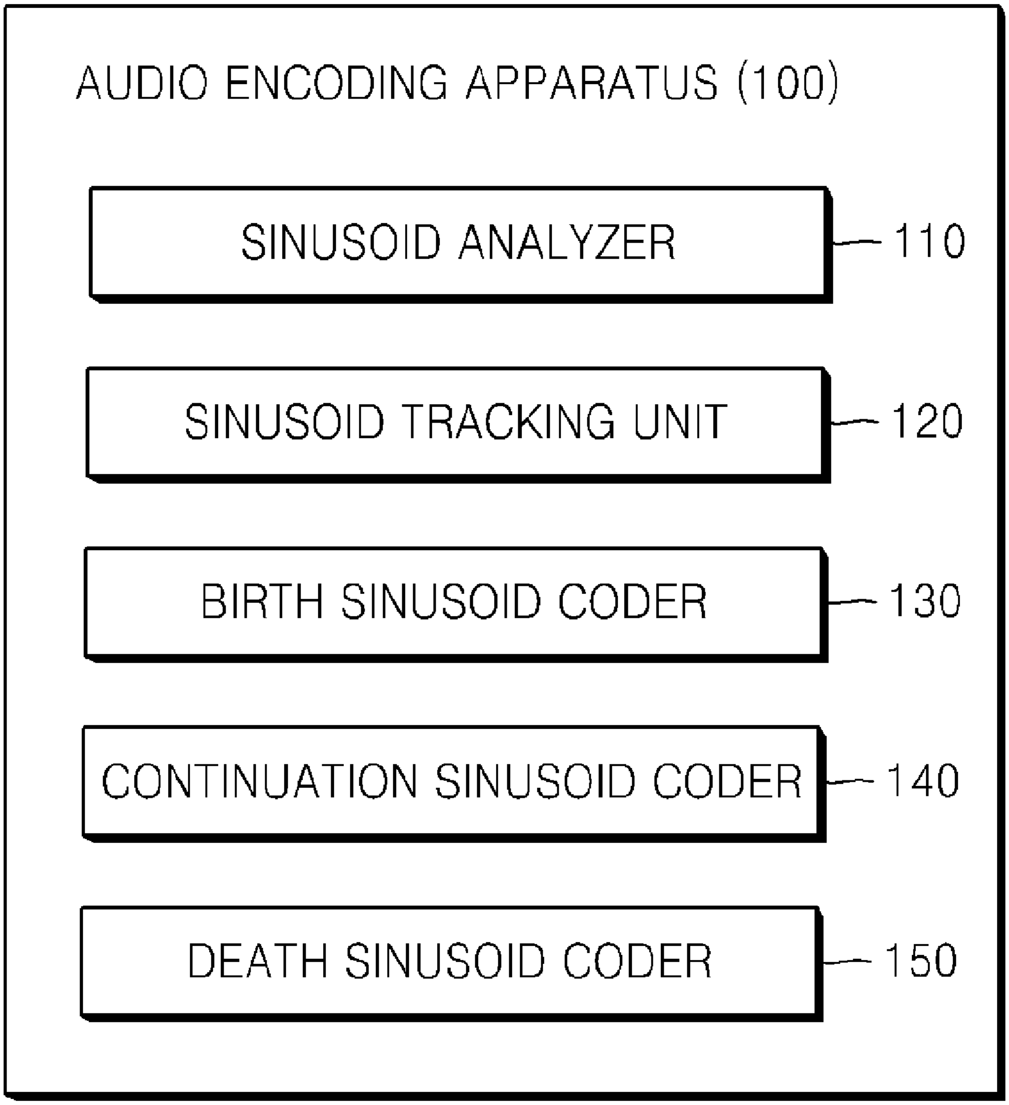
FIG. 5 is a block diagram of an audio encoding apparatus according to an embodiment of the present invention.

FIG. 4 is a flowchart illustrating an audio encoding method according to an exemplary embodiment of the present invention. FIG. 5 is a block diagram of an audio encoding apparatus 100 according to an exemplary embodiment of the present invention.

Referring to FIGS. 4 and 5, the audio encoding apparatus 100 according to the present exemplary embodiment of the present invention includes a sinusoid analyzer 110, a sinusoid tracking unit 120, a birth sinusoid coder 130, a continuation sinusoid coder 140, and a death sinusoid coder 150.

The sinusoid analyzer 110 extracts sinusoids by performing sinusoidal analysis of an input audio signal, in operation S100.

The sinusoid tracking unit 120 obtains a birth sinusoid, a continuation sinusoid, and a death sinusoid by performing sinusoid tracking of the extracted sinusoids of a current frame, in operation S110.

As described above, a sinusoid, which is not connected to a sinusoid of a previous frame, is called a birth sinusoid. A sinusoid, which is connected to a sinusoid of the previous frame and a sinusoid of a subsequent frame, is called a general continuation sinusoid. A sinusoid, which is connected to a sinusoid of the previous frame and which is not connected to a sinusoid of the subsequent frame, is called a death sinusoid.

A sinusoid to be encoded is quantized, in operation S120, and it is determined, in operation S130, whether the sinusoid to be encoded is a birth sinusoid. If it is determined, in operation S130, that the sinusoid to be encoded is not a birth sinusoid, it is determined, in operation S140, whether the sinusoid to be encoded is a death sinusoid.

According to another exemplary embodiment of the present invention, operations S130 and S140 may be simultaneously performed. That is, by simultaneously determining a type of the sinusoid to be encoded, operations S150, S160, and S170 may be directly performed according to the determined type.

If it is determined, in operation S130, that the sinusoid to be encoded is a birth sinusoid, the birth sinusoid coder 130 performs absolute coding of an amplitude component of the birth sinusoid, in operation S150.

If it is determined, in operations S130 and S140, that the sinusoid to be encoded is neither a birth sinusoid nor a death sinusoid, the sinusoid to be encoded is a general continuation sinusoid. In this case, the continuation sinusoid coder 140 performs Huffman coding of a difference between the amplitude of the general continuation sinusoid and the amplitude of a sinusoid of the previous frame to which the general continuation sinusoid is connected, in operation S170. A Huffman table used in this case is called a first Huffman table.

If it is determined, in operation S140, that the sinusoid to be encoded is a death sinusoid, the death sinusoid coder 150 obtains a difference between an amplitude component of the death sinusoid and an amplitude component of a sinusoid of the previous frame to which the death sinusoid is connected and performs Huffman coding of the obtained difference, in operation S160. A Huffman table used in this case is called a second Huffman table.

The second Huffman table is different from the first Huffman table. By using the first Huffman table and the second Huffman table, a general continuation sinusoid and a death sinusoid are distinguished from each other. Also, the first Huffman table uses a characteristic of the general continuation sinusoid, and the second Huffman table uses a characteristic of the death sinusoid. Since the death sinusoid has a decreasing characteristic, the second Huffman table has a characteristic that the number of bits used when a negative number is coded is less than the number of bits used when a positive number is coded. The number of bits used when a negative number is coded is less than the number of bits used when a positive number is coded includes assigning a smaller number of bits to a negative number in a case of numbers having the same absolute value.

Figure 6:
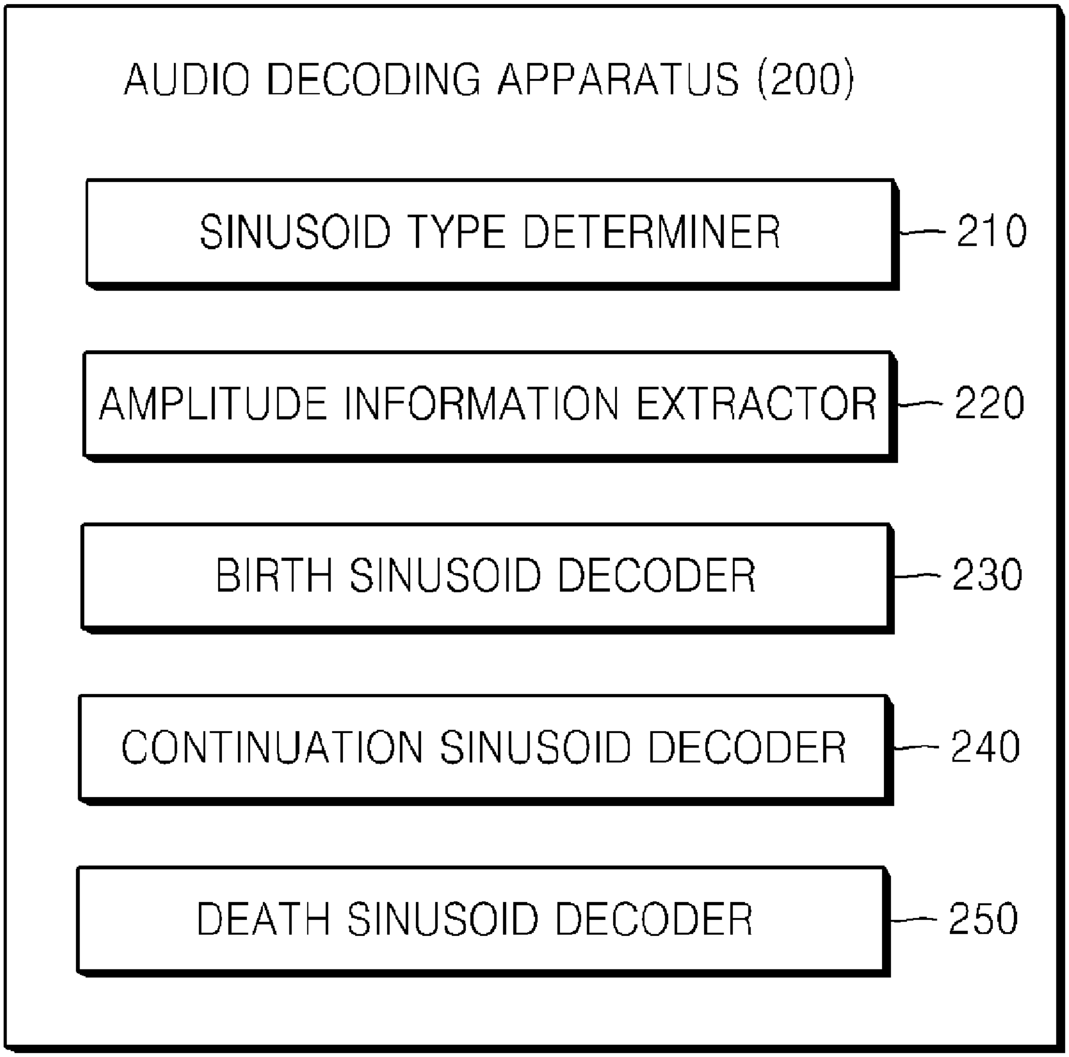
FIG. 6 is a block diagram of an audio decoding apparatus according to an exemplary embodiment of the present invention.

FIG. 6 is a block diagram of an audio decoding apparatus 200 according to an exemplary embodiment of the present invention.

Referring to FIG. 6, the audio decoding apparatus 200 according to an exemplary embodiment of the present invention includes a sinusoid type determiner 210, an amplitude information extractor 220, a birth sinusoid decoder 230, a continuation sinusoid decoder 240, and a death sinusoid decoder 250.

The sinusoid type determiner 210 determines whether a sinusoid to be decoded is a birth sinusoid, which is not connected to a sinusoid of a previous frame, a continuation sinusoid, which is connected to a sinusoid of the previous frame and a sinusoid of a subsequent frame, or a death sinusoid, which is connected to a sinusoid of the previous frame and which is not connected to a sinusoid of the subsequent frame.

The amplitude information extractor 220 extracts encoded amplitude information from an input bitstream.

If the sinusoid to be decoded is a birth sinusoid, the birth sinusoid decoder 230 obtains the amplitude of the birth sinusoid by decoding the encoded amplitude information.

If the sinusoid to be decoded is a continuation sinusoid, the continuation sinusoid decoder 240 obtains the amplitude of the continuation sinusoid by performing Huffman decoding of the encoded amplitude information using the first Huffman table and adding the decoded value to the sinusoid of the previous frame to which the continuation sinusoid is connected.

If the sinusoid to be decoded is a death sinusoid, the death sinusoid decoder 250 obtains the amplitude of the death sinusoid by performing Huffman decoding of the encoded amplitude information using the second Huffman table that is different from the first Huffman table and adding the decoded value to the sinusoid of the previous frame to which the death sinusoid is connected.

In this case, the second Huffman table has the characteristic that the number of bits used when a negative number is coded is less than the number of bits used when a positive number is coded.

The difference between an audio encoding method according to an exemplary embodiment of the present invention and an audio encoding method according to the prior art will now be described with reference to an experiment.

FIG. 7 is a table showing a gain in the number of bits when an audio encoding method according to an exemplary embodiment of the present invention is used in comparison to the prior art.

In order to obtain the result illustrated in FIG. 7, a bit rate bitrate1 of a case in which a death partial is encoded by applying the conventional method in which the death partial is not distinguished from a general continuation partial is measured.

A bit rate bitrate2 of a case in which a death partial is encoded using the second Huffman table of the present invention in which the death partial is distinguished from a general continuation partial is also measured.

The gain shown in the table illustrated in FIG. 7 is obtained using Equation 1.

$$\text{Gain}(\%) = \frac{(bitrate\ 1 - bitrate\ 2)}{bitrate\ 1} * 100(\%) \qquad \text{(Equation 1)}$$

Referring to FIG. 7, the experiment was performed using 10 test sequences (Bass, Brahms, Dongwoo, Dust, Gspi, Harp, Horn, Hotel, Spff, and Trilogy).

The first column, i.e., gain of the amplitude in continuation, denotes a decrease rate in the number of bits when an entire continuation sinusoid including a death sinusoid is encoded. Referring to FIG. 7, a decrease of 1.6% in a bit rate is obtained when using the present invention in comparison to a case in which the conventional method is applied.

The second column, i.e., gain in the entire bit rate, denotes a decrease rate in the number of bits when all of a birth sinusoid, a continuation sinusoid, and a death sinusoid are encoded. Referring to FIG. 7, a decrease of 0.7% in a bit rate is obtained when using the present invention in comparison to a case in which the conventional method is applied.

The present invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, etc. In an alternative embodiment, the computer readable recording medium may be carrier waves (such as data transmission through the Internet).

As described above, according to the present invention, when an audio signal is encoded or decoded, since a small number of bits are assigned to a negative value frequently appearing in difference coding of a death partial, a bit rate in the entire coding decreases.

The effectiveness in a decrease in the number of bits in comparison to the prior art when an audio encoding method according to an embodiment of the present invention is used is described with reference to FIG. 7.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An audio encoding method comprising:

extracting sinusoids of a current frame by performing sinusoidal analysis of an input audio signal;

obtaining a birth sinusoid, which is not connected to a sinusoid of a previous frame, a continuation sinusoid, which is connected to the sinusoid of the previous frame and a sinusoid of a subsequent frame, and a death sinusoid, which is connected to the sinusoid of the previous frame and which is not connected to the sinusoid of the subsequent frame, by performing sinusoid tracking of the extracted sinusoids of the current frame;

performing absolute coding of an amplitude of the birth sinusoid;

performing Huffman coding of a difference between an amplitude of the continuation sinusoid and an amplitude of the sinusoid of the previous frame to which the continuation sinusoid is connected, using a first Huffman table that is based on a characteristic of the continuation sinusoid; and performing Huffman coding of a difference between an amplitude of the death sinusoid and the amplitude of the sinusoid of the previous frame to which the death sinusoid is connected, using a second Huffman table different from the first Huffman table that is based on a decreasing; characteristic of an amplitude of the death sinusoid, wherein the second Huffman table is optimized to encode the death sinusoid based on the decreasing characteristic of the amplitude of the death sinusoid.

2. The audio encoding method of claim 1, wherein in the second Huffman table, a number of bits used when a negative number is coded is less than a number of bits used when a positive number is coded.

3. An audio encoding apparatus comprising:

a sinusoid analyzer which extracts sinusoids of a current frame by performing sinusoidal analysis of an input audio signal;

a sinusoid tracking unit, implemented by a processing unit, which obtains a birth sinusoid, which is not connected to the sinusoid of a previous frame, a continuation sinusoid, which is connected to a sinusoid of the previous frame and a sinusoid of a subsequent frame, and a death sinusoid, which is connected to the sinusoid of the previous frame and which is not connected to the sinusoid of the subsequent frame, by performing sinusoid tracking of the extracted sinusoids of the current frame;

a birth sinusoid coder which performs absolute coding of an amplitude of the birth sinusoid;

a continuation sinusoid coder which performs Huffman coding of a difference between an amplitude of the continuation sinusoid and an amplitude of the sinusoid of the previous frame to which the continuation sinusoid is connected, using a first Huffman table that is based on a characteristic of the continuation sinusoid; and a death sinusoid coder which performs Huffman coding of a difference between an amplitude of the death sinusoid and the amplitude of the sinusoid of the previous frame to which the death sinusoid is connected, using a second Huffman table that is based on a decreasing characteristic of an amplitude of the death sinusoid and that is different from the first Huffman table, wherein the second Huffman table is optimized to encode the death sinusoid based on the decreasing characteristic of the amplitude of the death sinusoid.

4. The audio encoding apparatus of claim 3, wherein in the second Huffman table, a number of bits used when a negative number is coded is less than a number of bits used when a positive number is coded.

5. An audio decoding method comprising:

determining whether a sinusoid to be decoded is a birth sinusoid, which is not connected to a sinusoid of a previous frame, a continuation sinusoid, which is connected to the sinusoid of the previous frame and a sinusoid of a subsequent frame, or a death sinusoid, which is connected to the sinusoid of the previous frame and which is not connected to the sinusoid of the subsequent frame;

extracting encoded amplitude information of the sinusoid to be decoded from an input bitstream;

if the sinusoid to be decoded is the birth sinusoid, obtaining an amplitude of the birth sinusoid by decoding the extracted encoded amplitude information;

if the sinusoid to be decoded is the continuation sinusoid, obtaining an amplitude of the continuation sinusoid by performing Huffman decoding of the extracted encoded amplitude information using a first Huffman table that is based on a characteristic of the continuation sinusoid and adding a decoded value to the sinusoid of the previous frame to which the continuation sinusoid is connected; and if the sinusoid to be decoded is the death sinusoid, obtaining an amplitude of the death sinusoid by performing Huffman decoding of the extracted encoded amplitude information using a second Huffman table that is based on a decreasing characteristic of an amplitude of the death sinusoid and that is different from the first Huffman table and adding a decoded value to the sinusoid of the previous frame to which the death sinusoid is connected, wherein the second Huffman table is optimized to encode the death sinusoid based on the decreasing characteristic of the amplitude of the death sinusoid.

6. The audio decoding method of claim 5, wherein in the second Huffman table, a number of bits used when a negative number is coded is less than a number of bits used when a positive number is coded.

7. An audio decoding apparatus comprising:

a sinusoid type determiner, implemented by a processor, which determines whether a sinusoid to be decoded is a birth sinusoid, which is not connected to a sinusoid of a previous frame, a continuation sinusoid, which is connected to the sinusoid of the previous frame and a sinusoid of a subsequent frame, or a death sinusoid, which is connected to the sinusoid of the previous frame and which is not connected to the sinusoid of the subsequent frame;

an amplitude information extractor which extracts encoded amplitude information of the sinusoid to be decoded from an input bitstream;

a birth sinusoid decoder which, if the sinusoid to be decoded is the birth sinusoid, obtains an amplitude of the birth sinusoid by decoding the extracted encoded amplitude information;

a continuation sinusoid decoder which, if the sinusoid to be decoded is the continuation sinusoid, obtains an amplitude of the continuation sinusoid by performing Huffman decoding of the extracted encoded amplitude information using a first Huffman table that is based on a characteristic of the continuation sinusoid and adding a decoded value to the sinusoid of the previous frame to which the continuation sinusoid is connected; and a death sinusoid decoder which, if the sinusoid to be decoded is the death sinusoid, obtains an amplitude of the death sinusoid by performing Huffman decoding of the extracted encoded amplitude information using a second Huffman table different from the first Huffman table that is based on a decreasing characteristic of an amplitude of the death sinusoid and adding a decoded value to the sinusoid of the previous frame to which the death sinusoid is connected, wherein the second Huffman table is optimized to encode the death sinusoid based on the decreasing characteristic of the amplitude of the death sinusoid.

8. The audio decoding apparatus of claim 7, wherein in the second Huffman table, a number of bits used when a negative number is coded is less than a number of bits used when a positive number is coded.

9. A non-transitory computer readable recording medium having embodied thereon a computer program, which when executed by a computer causes the computer to execute a method for executing audio encoding, the method comprising:

extracting sinusoids of a current frame by performing sinusoidal analysis of an input audio signal;

obtaining a birth sinusoid, which is not connected to a sinusoid of a previous frame, a continuation sinusoid, which is connected to the sinusoid of the previous frame and a sinusoid of a subsequent frame, and a death sinusoid, which is connected to the sinusoid of the previous frame and which is not connected to the sinusoid of the subsequent frame, by performing sinusoid tracking of the extracted sinusoids of the current frame;

performing absolute coding of an amplitude of the birth sinusoid;

performing Huffman coding of a difference between an amplitude of the continuation sinusoid and an amplitude of the sinusoid of the previous frame to which the continuation sinusoid is connected, using a first Huffman table that is based on a characteristic of the continuation sinusoid; and performing Huffman coding of a difference between an amplitude of the death sinusoid and the amplitude of the sinusoid of the previous frame to which the death sinusoid is connected, using a second Huffman table that is different from the first Huffman table that is based on a decreasing characteristic of an amplitude of the death sinusoid, wherein the second Huffman table is optimized to encode the death sinusoid based on the decreasing characteristic of the amplitude of the death sinusoid.

10. The non-transitory computer readable recording medium of claim 9, wherein in the second Huffman table, a number of bits used when a negative number is coded is less than a number of bits used when a positive number is coded.

11. A non-transitory computer readable recording medium having embodied thereon a computer program, which when executed by a computer causes the computer to execute a method for executing audio decoding, the method comprising:

determining whether a sinusoid to be decoded is a birth sinusoid, which is not connected to a sinusoid of a previous frame, a continuation sinusoid, which is connected to the sinusoid of the previous frame and a sinusoid of a subsequent frame, or a death sinusoid, which is connected to the sinusoid of the previous frame and which is not connected to the sinusoid of the subsequent frame;

extracting encoded amplitude information of the sinusoid to be decoded from an input bitstream;

if the sinusoid to be decoded is the birth sinusoid, obtaining an amplitude of the birth sinusoid by decoding the extracted encoded amplitude information;

if the sinusoid to be decoded is the continuation sinusoid, obtaining an amplitude of the continuation sinusoid by performing Huffman decoding of the extracted encoded amplitude information using a first Huffman table that is based on a characteristic of the continuation sinusoid and adding a decoded value to the sinusoid of the previous frame to which the continuation sinusoid is connected; and if the sinusoid to be decoded is a death sinusoid, obtaining an amplitude of the death sinusoid by performing Huffman decoding of the extracted encoded amplitude information using a second Huffman table that is based on a decreasing characteristic of an amplitude of the death sinusoid and that is different from the first Huffman table and adding a decoded value to the sinusoid of the previous frame to which the death sinusoid is connected;

wherein the second Huffman table is optimized to encode the death sinusoid based on the decreasing characteristic of the amplitude of the death sinusoid.

12. The non-transitory computer readable recording medium of claim 11, wherein in the second Huffman table, a number of bits used when a negative number is coded is less than a number of bits used when a positive number is coded.

* * * * *